Jan. 8, 1946. H. MURTAGH ET AL 2,392,494
INSTRUMENT FOR USE ON MOVING CRAFT
Filed June 19, 1943 3 Sheets-Sheet 1

INVENTORS
HUGH MURTAGH
JOHN A. TAYLOR
BY
Herbert H. Thompson
THEIR ATTORNEY

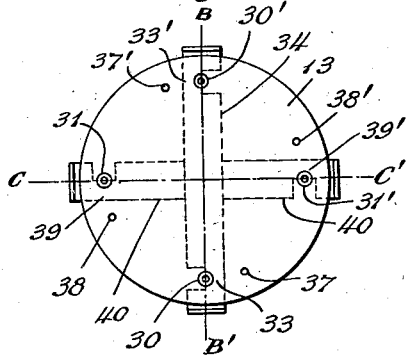
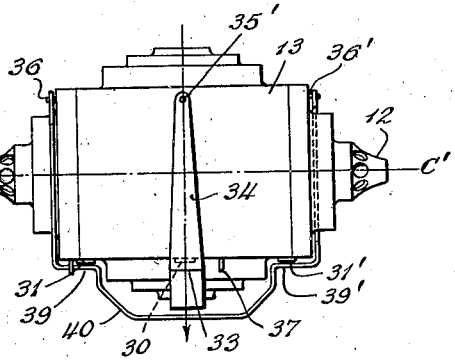
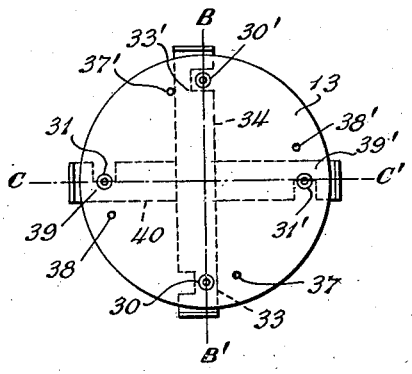
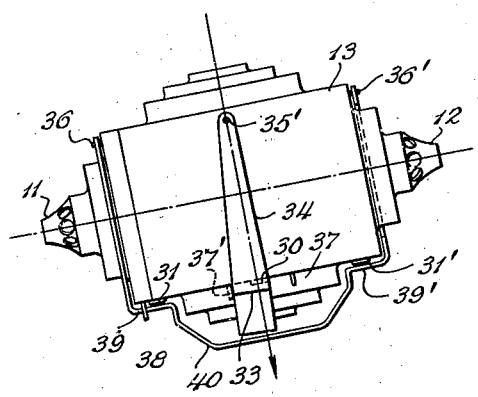
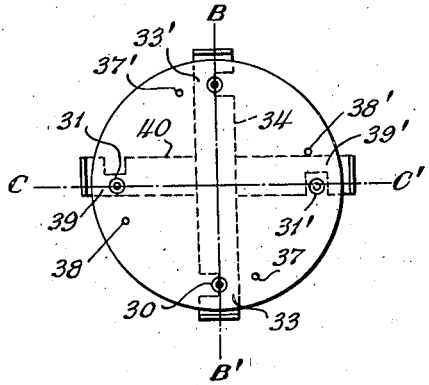
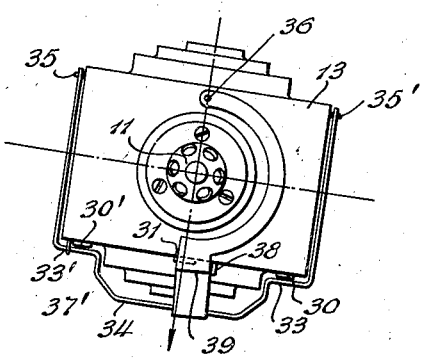

Jan. 8, 1946.   H. MURTAGH ET AL   2,392,494
INSTRUMENT FOR USE ON MOVING CRAFT
Filed June 19, 1943   3 Sheets-Sheet 3

INVENTORS
HUGH MURTAGH
JOHN A. TAYLOR
BY
Herbert H. Thompson
THEIR ATTORNEY.

Patented Jan. 8, 1946

2,392,494

UNITED STATES PATENT OFFICE 2,392,494

INSTRUMENT FOR USE ON MOVING CRAFT

Hugh Murtagh, Laleham-on-Thames, and John Alfred Taylor, Kingsbury, England

Application June 19, 1943, Serial No. 491,548
In Great Britain May 28, 1942

9 Claims. (Cl. 33—204)

This invention relates to instruments for use on moving craft, particularly on aircraft, for determining the direction of the vertical by means of a frame which is free to tilt relatively to the craft about two horizontal axes and is gyroscopically stabilised to maintain a fixed angular relationship to the vertical, in spite of pitching or rolling of the craft. Such instruments are termed gyroverticals or gyro-horizons. More particularly the invention is concerned with instruments of this class in which freedom of the gyroscopically-stabilised frame relative to the aircraft is conferred by a cardan suspension. In such instruments the stabilised frame may be stabilised by means of a single rotor having a vertical spin axis, in which case the stabilised frame is identical with the rotor-bearing frame or rotor case of the gyroscope; alternatively, two rotors having horizontal axes at right angles to each other may be employed, each carried in a bearing frame or rotor case, these bearing frames being pivoted about horizontal axes on the stabilised frame. In either case the stabilised frame is stabilised by the gyroscope rotor or rotors carried on it, the stabilisation being effective because the frame is free to tilt relatively to the aircraft by virtue of the cardan suspension.

In known types of gyro-horizon used on aircraft difficulties arise when the aircraft tilts through large angles, approaching or exceeding 90°, from its normal horizontal position, as may happen in banked turns or in special manoeuvres such as looping the loop or barrel-rolling. The difficulties are due to the fact that one of gimbal axes of the gyroscope comes into line, or nearly into line, with another axis to which it is normally perpendicular, and the gyroscope then loses one degree of freedom and ceases to operate in the normal manner. For example, in the case of a gyro-horizon having a single rotor with vertical axis whose rotor case is mounted in gimbals having fore-and-aft and transverse gimbal axes, a manoeuvre of the craft may result in the outer gimbal axis coming into line with the rotor axis. All three axes of the gyroscope then lie instantaneously in a plane and the gyroscope has no freedom in this plane. Angular movement of the craft in this plane therefore causes violent precession of the gyroscope. Furthermore, when the outer axis and the rotor axis are in line, there is a tendency for the cardan ring and rotor case to turn, or even in some cases to spin, about the common axis of the rotor and the outer gimbals; the angular position of the gimbal ring is thereby disturbed, which causes subsequent errors in the indications of the instrument, and leads in turn to the application of further disturbing torques to the gyroscope as the craft completes its manoeuvre. A still more serious defect is that, if the outer gimbal axis does come into line with the rotor axis and the gimbal system does spin round the rotor axis, the gyroscope is thereafter forced to follow the movements of the craft and cannot free itself from the spinning gimbals.

The invention aims at avoiding these defects in prior types of gyro-horizon. It provides a gyro-horizon in which the gyroscopically stabilised frame remains stabilised and undisturbed during inclinations of the craft on which it is carried up to and exceeding 90°, and in fact during all the recognised acrobatic manoeuvres that an aircraft may carry out, including complete loops, complete rolls, and half-loops followed by half rolls.

According to the invention the improved gyro-horizon comprises a frame carrying one or more stabilising gyroscopes, this frame being supported with freedom to turn relatively to the craft about two mutually perpendicular horizontal axes by means of a suspension of the cardan type which is arranged so that the gimbal frames are free to rotate about their axes of support throughout 360°, and so that the stabilised frame retains two degrees of rotational freedom relative to the craft even if the craft becomes inclined through 90° from its normal horizontal position or carries out such acrobatic manoeuvres as a complete loop, a complete roll, or a half-loop followed by a half-roll.

In one embodiment of the invention described in more detail hereinafter the gyro-horizon has a single rotor spinning about a vertical axis in a rotor case, or rotor-bearing frame, which is supported in a supporting frame by means of a cardan suspension adapted to provide the rotor-bearing frame with two degrees of precessional freedom relative to the supporting frame, each extending throughout 360°, about two mutually perpendicular horizontal axes, and the said supporting frame also is mounted for rotational freedom throughout 360° in an outer support and is gravity-controlled.

In this gyro-horizon neither of the gimbal axes by which the rotor case is suspended from the gravity-controlled supporting frame can come into line with the rotor axis during flight of the aircraft, even if the aircraft carries out acrobatic manoeuvres; the gyroscope therefore always has three degrees of freedom—one of rotation and two of precession. This results from the fact that the outer gimbal axis is always controlled by gravity, or by the resultant of gravity and the acceleration of the craft, into a direction at right angles to this resultant; for this reason the outer gimbal axis carried by the gravity-controlled supporting frame can never come into line with the vertical spin axis of the rotor. It is true that during certain manoeuvres of the aircraft the axis of support of the gravity-controlled frame can become vertical and thus come into line with the spin axis of the rotor and the whole system of the rotor case, gimbal rings, and gravity-controlled frame, is then free to turn about the vertical axis; however, this condition can only exist momentarily, and, as soon as the axis of support departs again from the vertical, the gravity-controlled frame is once more definitely positioned by gravity about its axis of support, and the instrument operates as before without any permanent change in the position of the gimbal frame due to the temporary alignment of the two axes. Furthermore, during the whole period of the manoeuvre under consideration, even when the axis of the gravity-controlled frame is in line with the rotor spin axis, the gyroscope has three degrees of freedom so that torques cannot be transmitted from the craft through the gimbal system to produce forcible precession of the gyroscope.

In order that the invention may be clearly understood and readily carried into effect, it will now be described more fully with reference to the accompanying drawings in which Figure 1 is a sectional plan view of an instrument constituting one embodiment of the present invention.

Figure 3 is a plan view from inside the rotor case of certain ports therein and control shutters therefor.

Figure 4 is an elevation of the rotor case viewed transversely corresponding to the plan view of Figure 3.

Figures 5 and 6 correspond closely with Figures 3 and 4 respectively but show the instrument tilted anticlockwise about the transverse axis.

Figure 7 is a plan view of the rotor case corresponding closely with Figures 3 and 5 but shows the effect on the ports and shutters of a tilt of the instrument clockwise about the fore-and-aft axis.

Figure 8 is related to Figure 7 in that it is an elevation taken in the fore-and-aft direction of the rotor case when tilted clockwise about the fore-and-aft axis; it should be understood therefore that Figure 7 is turned 90° with respect to Figure 8.

Figure 1:
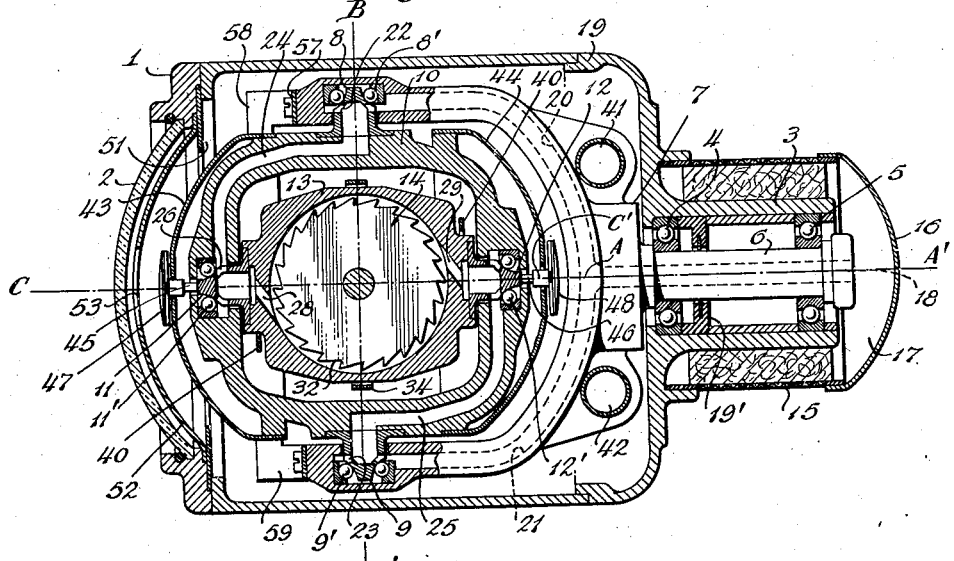
Figure 2:
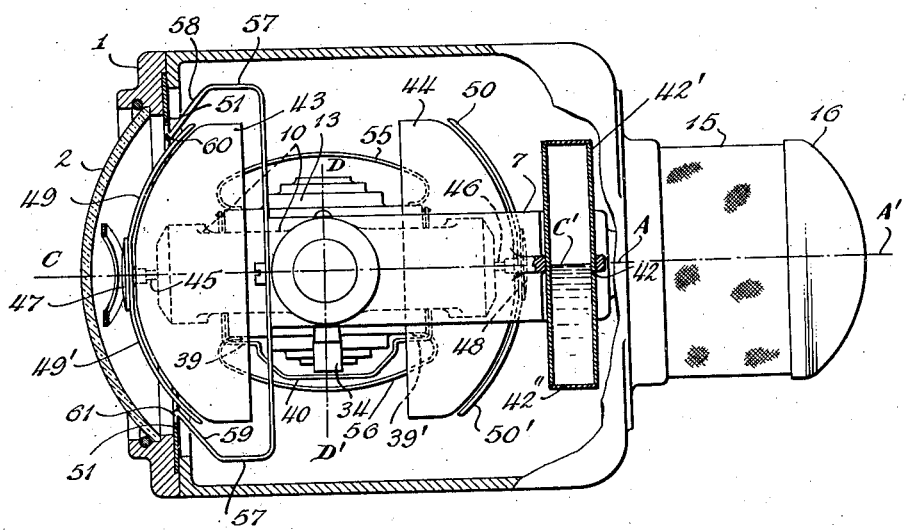
Figure 2 is an elevation, partly in section, in the vertical plane.
Figure 9:
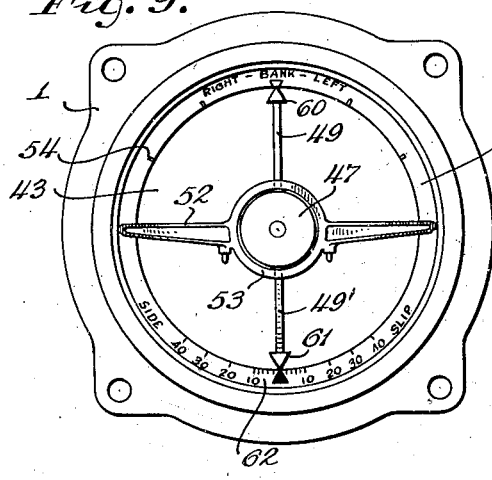
Figure 10:
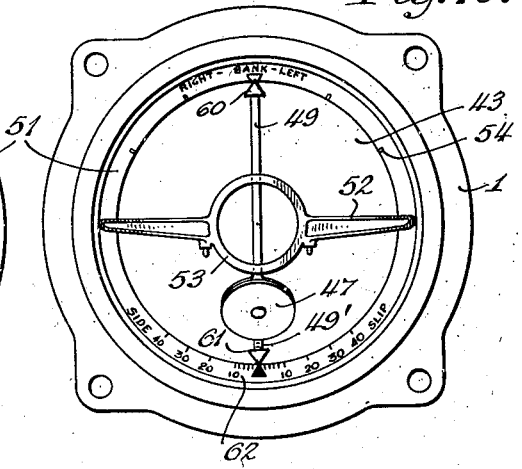
Figure 11:
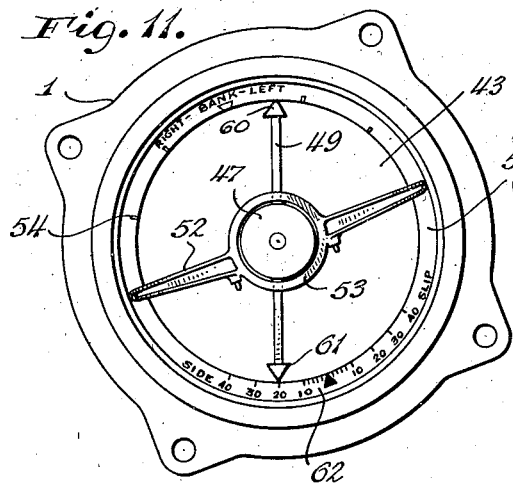
Figure 12:
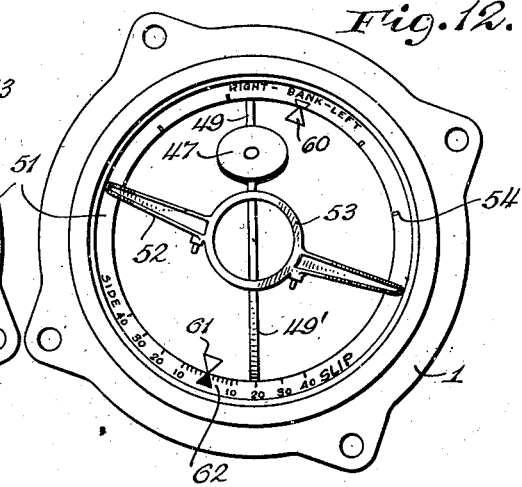

Figures 9 to 13 are views of the indications seen on looking at the front or face of the instrument shown in Figures 1 and 2 under different conditions of flight of the craft carrying the instrument. Figure 9 represents the indications provided during level flight; Figure 10 those provided during a dive; Figure 11 those provided when the craft is banked to the left without turning; Figure 12 those provided during a climb and turn to the right with correct bank; and Figure 13 those provided during a turn to the left with an insufficient angle of bank.

In Figs. 1 and 2, the reference numeral 1 denotes the instrument case, while 2 is an observation window. The case 1 has a tubular extension 3 at the rear, within which is journalled, in spaced ball bearings 4, 5, the stem 6 of a hollow forked frame 7, which is thus free to turn through 360° about the axis AA' of the bearings 4, 5, which axis is parallel to the fore-and-aft axis of the craft. Within the frame 7 there is journalled a gimbal ring 10 by means of pivots 8, 9 supported in ball bearings 8', 9'. The ring 10 normally lies in a horizontal plane but is free to undergo complete revolutions relative to the supporting frame 7 about the axis BB' defined by the bearings 8', 9', which axis is perpendicular to the axis AA' and is normally horizontal, so that it coincides with the transverse axis of the craft when the craft is flying horizontally. Within the gimbal ring 10 there is journalled the rotor case 13 by means of pivots 11, 12 supported in ball bearings 11', 12'. The rotor case 13 is free to undergo complete revolutions relative to the gimbal ring 10 about the axis CC' defined by the bearings 11', 12', which axis is perpendicular to BB' and is normally horizontal and is therefore normally in line with the axis AA', i. e., when the craft is flying horizontally. The rotor 14 spins in bearings (not shown) about a normally vertical axis DD' in the rotor case 13.

Attached to the back of the instrument case is a cylindrical cover 15 (of fine gauze) with a cap 16; these together enclose a space 17 surrounding the extension 3 of the instrument casing. The stem 6 of the forked gimbal-supporting frame 7 is tubular, and its bore 18 is in communication with the space 17. The interior space 19 of the instrument casing 1 is substantially shut off from communication with the space 17 by a partition 19' which extends inwards from the tubular extension 3 of the instrument case. The partition 19' definitely clears the stem 6, but the clearance is small enough to oppose a high resistance to the flow of air through it. The bore 18 in the stem 6 is in communication with passages 20, 21 in the forked gimbal frame 7, and these in turn communicate, via passages 22, 23 in the pivots 8, 9, with passages 24, 25 in the gimbal ring 10, which passages communicate, via passages 26, 27 in the pivots 11, 12, with passages 28, 29 in the rotor case 13. The passages 28, 29 open into the interior of the rotor case in directions substantially tangential to the rotor 14.

The rotor case 13 totally encloses the rotor and is air-tight except for six ports. Two of these are the passages 28, 29 already described by which air enters to spin the rotor. In addition there are four exit ports 30, 30', 31, 31' (Figs. 3 to 8) directed vertically downwards through the bottom of the rotor case by which air can leave the rotor case and pass into the space 19 in the instrument casing 1. This space 19 is maintained at a pressure below atmospheric pressure by means of a suction pump, not shown, the instrument casing 1 being otherwise air-tight.

When the suction pump is operating, air is sucked in through the cylindrical fine gauze cover 15 into the space 17, thence via passages 18, 20, 22, 24, 26, 28 and also via passages 18, 21, 23, 25, 27, 29 into the interior of the rotor case, and thence through whichever of the ports 30, 30', 31, 31' may be uncovered into the space 19 inside the casing 1 from which it is finally extracted by the suction pump. The air thus entering the interior of the rotor case 13 from the passages 28, 29 does so in the form of high velocity jets; these are so directed as to impinge against buckets 32 cut on the periphery of the rotor 14, so that the rotor is spun at a high angular velocity. The spent air circulates in the interior of the casing 13 and finally issues from the jets 30, 30', 31, 31' as jets of appreciable velocity.

The ports 30, 30' are spaced at equal distances laterally from the centre of the gyroscope (defined as the intersection of the axes BB', CC') and are so designed that the air jets issuing from them when the ports are uncovered exert equal and opposite reaction torques about the axis CC', while neither exerts any torque about the axis BB'. Similarly, the ports 31 and 31' are spaced at equal distances fore and aft from the centre of the gyroscope and are so designed that the air jets issuing from them when the ports are uncovered exert equal and opposite reaction torques about the axis BB', while neither exerts any torque about the axis CC'. It follows that, if all the jets are uncovered, the reactions they exert on the rotor case 13 are balanced, since each jet is balanced by an equal oppositely acting jet.

The laterally spaced jets 30, 30' are variably controlled by means responsive to relative inclination about the axis BB' (i. e., relative pitch) of the rotor case 13 on the one hand and the direction of the resultant of the gravity and acceleration fields on the other hand. As shown, this result is obtained by the provision of shutters 33, 33', which form part of a pendulous stirrup-shaped shutter frame 34 and which variably intercept the jets 30, 30' in accordance with the tilt of rotor case 13 relative to the shutter frame 34. The frame 34 is pivotally mounted about an axis parallel to BB' by pivots 35, 35' supported in bearings in the upper part of the rotor case 13. In the normal relative position of the rotor casing 13 and the pendulous shutter frame 34 shown in Figs. 3 and 4—which is that taken up, for example, when the axis of the rotor 14 is vertical and the pendulous shutter frame 34 is hanging freely under gravity and when no acceleration forces are operating—the shutters 33, 33' intercept the jets 30, 30' to equal extents—viz. they intercept substantially one-half of each jet. If this relative position is disturbed, e. g., by precessional tilting of the gyroscope about the transverse axis BB' (pitch) as shown in Figs. 5 and 6, as a result of frictional torques, one of the jets 30, 30' is uncovered by its shutter 33 or 33' to a greater extent than normal and the other to a less extent, with the result that an unbalanced air jet reaction is applied to the rotor case. This unbalanced air jet reaction applies a torque to the rotor case 13 about the axis CC' and thus causes the rotor case to precess about the gimbal axis BB' back towards the normal position of alignment with the shutter frame 34. Preferably the rotor case 13 is in substantially neutral equilibrium about the axis CC', and the combination of rotor case 13 and inner gimbal frame 10 is in substantially neutral equilibrium about the axis BB' so that no direct gravitational torques are exerted if tilting of the gyroscope should occur. Consequently, if the gyroscope should tilt about the transverse axis BB', the torques exerted by the air jets 30, 30' are the only ones that operate, and these produce erection of the gyroscope back to the vertical position in the plane of tilt without the occurrence of any conical oscillation.

Similarly jets 31, 31' are controlled by shutters 39, 39' forming part of the pendulous stirrup-shaped frame 40 in accordance with relative tilt of the rotor case and the shutter frame 40.

As can be seen in Figure 8 the upright arms of the stirrup-shaped frame 40 are curved round the bosses of the pivots 11, 12 so that the frame can swing freely through a small angle about the pivots 36, 36' without fouling these pivot bosses.

In Figs. 7 and 8 the conditions holding good during a precessional tilt of the rotor case 13 about the fore-and-aft axis CC' are illustrated.

As shown the air jet nozzle 31 is uncovered by the shutter 39 while nozzle 31' is covered by the shutter 39'. An unbalanced reaction torque about the axis BB' is therefore exerted by the air jet from nozzle 31; this causes the rotor and rotor case to precess about the axis CC' back into alignment with the frame 40.

The extent of the possible angular movement of the frames 34, 40 about the pivot axis 35—35' and 36—36' relative to the rotor case 13 is limited by stops 37, 37' and 38, 38' respectively, so that Figs. 5 and 6 represent the conditions holding good during relative inclinations of the rotor case 13 and frame 34, and Figs. 7 and 8 those during relative tilts of the rotor case 13 and frame 40, not only through the angle shown, but through any greater angle.

The use of pendulous shutters for controlling air jets issuing from the rotor case of a substantially neutral gyro-horizon so as to cause erecting torques to be applied, in a manner similar to that described herein in connection with the ports 30, 30', 31, 31' and the shutters 33, 33', 39, 39', is described and claimed in Patent No. 1,982,636, dated December 4, 1934, for Air driven gyro verticals. However, in the present embodiment of the invention, in order to reduce the overall dimensions of the rotor case 13 and thus to permit the rotor case to undergo complete revolutions about each of the horizontal axes of support BB' and CC', without any increase in the diameter of the instrument case 1, the shutters 33, 33', 39, 39' are mounted in the novel manner hereinbefore described, i. e., the shutters 33, 33' of a pair are linked together by a frame 34 external to the gyroscope and this frame is mounted on a pair of pivots instead of on an axle passing through the rotor case. In this way the pendulous shutter frames can be pivoted on any axis whatever in the rotor case, and there is no need to provide an extension of the rotor case below the lower bearing of the rotor to carry a pivot shaft for the pendulous shutters.

The gyroscope of the present invention is of the type that is generally known as a gyroscope with three degrees of freedom, since the rotor is free to turn, i. e., rotate, about the axis DD' and this axis is free to turn, i. e., precess, in two perpendicular planes, each containing the rotor axis. Precessional freedom in the plane DD', BB' is conferred by the freedom of the rotor case 13 to turn about the inner gimbal axis CC' in the gimbal ring 10. Precessional freedom in the plane DD', CC' is conferred by the freedom of the gimbal ring 10 to turn about the outer gimbal axis BB' in the forked gimbal frame 7. Thus the rotor has one degree of rotational freedom and two degrees of precessional freedom relative to the frame 7.

In previous three-degrees-of-freedom gyroscopes used as inclination indicating instruments for vehicles such as aircraft the frame relative to which the rotor had three degrees of freedom was the vehicle itself or was a frame rigidly or resiliently connected to the vehicle. An instrument equivalent to those of the prior art would thus result if the forked gimbal frame 7 were rigidly locked to the instrument casing 1. When such instruments are used on aircraft and the aircraft turns through 90° about the axis CC', the outer gimbal axis BB' comes into line with the rotor axis DD'. The rotor then has no freedom to precess in the plane DD', CC', and, if the craft at that time has any component angular velocity in this plane, the gyroscope is caused to precess violently in the plane normal to the axis CC'. In practice the gyroscope is very liable to be disturbed if the axis BB' approaches to within 5° or 10° of the direction of the rotor axis DD'. Thereafter the instrument would give indications that might be considerably in error for some time. Moreover, in such an instrument, when the axis BB' comes into line with the rotor axis DD', the whole assembly of rotor case 13 and gimbal ring 10 can turn about the common axis BB', DD' under slight disturbing forces such as friction or air currents, since there is nothing to restrain such rotational displacement nor to define a position for the assembly about this common axis. If the assembly should turn about the common axis, further manoeuvres of the craft taking the axis BB' out of line with DD' can exert further disturbing torques on the gyroscope. It may even happen in some cases that, if the axis BB' comes into line with the axis DD', the assembly of rotor case 13 and gimbal ring 10 may start to spin continuously about the common axis BB', DD'. In that case it may become impossible for the axis DD' to escape from alignment with the axis BB' because an incipient escape from alignment in any particular direction is suppressed as the gimbal ring 13 turns about BB' towards the direction in which DD' is escaping. When the gimbal ring approaches this position a kind of toggle action takes place by which the axis DD' is forced back into alignment with the axis BB', the force exerting the toggle to effect this being derived from the angular momentum of the gimbal ring. As a result of this action the rotor is forcibly precessed to follow all movements of the axis BB', i. e., all movements of the craft.

In the present invention these defects of prior instruments are overcome by providing the frame 7 with freedom to turn relatively to the instrument casing 1 and by governing the frame 7 by gravity. It is for this purpose that the frame 7 is rotatably mounted in the casing 1 about the axis AA' (which is normally in line with the inner gimbal axis CC'). Gravitational control of the frame 7 about the axis AA' may readily be obtained by making the frame simply pendulous about this axis, e. g., by arranging that the axis BB' lies below the horizontal plane through AA'. However, we prefer to effect gravitational control in another manner, which will now be explained.

In the frame 7 there are secured two vertical cylindrical containers 41, 42, symmetrically placed with respect to the axis AA'. These are partly filled with liquid, e. g., with mercury. When the containers are empty the forked frame 7 together with the parts of the gyroscope that it serves to support are in neutral equilibrium about the axis AA', so that the addition of the mercury makes the frame 7 as a whole pendulous about the axis AA'.

It can readily be seen that, if the aircraft banks about the axis AA' to an angle of nearly 90° or rolls completely over about this axis, the axis BB' will not come into line with the axis DD'. If there were no side-slip, the axis BB' would stay horizontal and therefore at right angles to DD'; actually side-slip does occur down the inclined plane of the wings and the acceleration down this plane tends to leave behind the pendulous liquid in the containers 41, 42, so that the pendulous frame 7 does turn about the axis AA', however, it does not turn through an angle even approaching 90°, so that the axis BB' always continues to make a large angle with DD' and the gyroscope continues to retain three degrees of freedom.

It might be expected that one degree of freedom would be lost if the aircraft were to pitch upwards through 90°, thereby bringing the axis AA' into line with the rotor axis DD'. In spite of this the gyroscope still retains three degrees of freedom about DD', CC' and BB'. Nevertheless, it is of interest to investigate the second difficulty experienced in prior instruments when normally different axes come into alignment, namely rotation of the gimbal frame. It is true that, if the axes AA', DD', come into line, the whole assembly of rotor case 13, gimbal ring 10, and outer frame 7, becomes free to rotate about the common axis AA', DD'. However, even if this assembly does become angularly displaced about the common axis, the gyroscope retains three degrees at each position, so that torques cannot be transmitted through the gimbal system to disturb the gyroscope.

The possibility that the gimbal system may start spinning round the common axis AA', DD' has still to be considered. This is very unlikely in the instrument of the invention, as one of the main causes of such spinning is abnormal frictional forces between the rotor and the rotor case resulting from abnormal bearing stresses due to forced precession of the gyroscope, and these cannot exist in the new instrument owing to the absence of forced precession due to the continuous retention of three degrees of freedom. Also rotation of the rotor case and gimbal assembly round the common axis, even if it should occur, cannot forcibly suppress incipient escape of the axis DD' from alignment with the axis AA' because there is no angular position round the common axis in which one of the three degrees of freedom is lost, so that the toggle action that caused forced precession in prior instruments does not take place.

Finally, as the aircraft completes its manoeuvre and the axis AA' ceases to be vertical, the gravity control of the frame 7 takes effect again and this frame is brought at each instant into a position depending only on the attitude and motion of the craft at that instant. It follows that, even if the axis AA' does come into line with the axis DD', not only will the gyroscope rotor not be disturbed but also the angular position of the gimbal frames is very unlikely to be appreciably disturbed. It is possible that the position of the gimbal frames will be disturbed instantaneously when the craft is climbing or diving vertically and the axis AA' is actually in line with the axis DD', but, even then, this disturbance is annulled by the action of the gravity control on the frame 7 immediately the aircraft changes its attitude and takes the axis AA' out of alignment with the axis DD'; thereafter the position of the gimbal frames at each instant is determined only by the attitude and motion of the craft at that instant, in exactly the same manner as if the craft had never passed through a vertical climb or dive attitude.

Consideration of the operation of the instrument during a manoeuvre by the craft consisting of a half-loop followed by an interval of straight flight in an upside-down position and a half roll brings out additional features of the invention. During the half-loop strong centrifugal forces are acting relatively to the aircraft on the mercury in the containers 41, 42. These forces act radially outwards from the centre of the curved path of the loop and thus act along towards the floor of the cabin or cockpit even when the aircraft is climbing vertically and even towards the end of the half-loop when the aircraft is almost wholly inverted. The centrifugal acceleration is greater than the acceleration of gravity, so the gimbal frame 7 is acted on by a resultant force towards the floor of the cabin and thus does not turn relatively to the instrument casing 1.

Towards the end of the half-loop, just before the aircraft's path straightens out, the aircraft is flying upside-down, so that the ends 41'', 42'' of the containers 41, 42 are uppermost, the mercury being held in these ends by centrifugal force. When the aircraft's path straightens out, the centrifugal force vanishes and gravity acts alone; the mercury in the containers 41, 42 at once falls to ends 41', 42', which are at this time the lower ends, and no change occurs in the position of the gimbal rings relative to the aircraft. This behaviour of the instrument may be contrasted with what would occur if the gravity control of the frame 7 were effected, not by employing liquid in the containers 41, 42, but by the rigid attachment to the frame of pendulous masses. Such an instrument would behave in most circumstances in the same manner as the instrument so far described, but, at the top of the half-loop manoeuvre when the aircraft straightens out and centrifugal force ceases to operate, the frame would be left in a top-heavy condition. In this position the instrument would be unstable, and, perhaps after an instant of rest in the position of unstable equilibrium, the pendulous frame 7 would turn through 180° round the axis AA' to lower its centre of gravity, taking with it the gimbal ring 10 which would turn relatively to the rotor case round the axis CC'. An instrument of this character is within the scope of the invention, but we prefer to avoid the sudden inversion of the frames 7 and the ring 10 that occurs in it at the end of a half-loop by adopting the principle illustrated in the drawings of providing gravity control of the frame 7 by means of displaceable masses, i. e., the liquid in the containers 41, 42, so arranged that, if the frame 7 is inverted the masses move relatively to the frame into new lower positions available to them, whereby the frame is then gravitationally stable in its inverted position.

If the aircraft, after completing a half-loop and flying upside-down, carries out a half-roll, the whole assembly of rotor case 13, gimbal ring 10, and pendulous frame 7 is unaffected and the aircraft merely rolls round the frame 7 about the axis AA'. The relations between the craft and the gyroscope during the whole manoeuvre may be described by the statement that the craft and the frame 7 first turn through 180° round the gyroscope about the axis BB' and then the craft turns round the gyroscope and frame 7 about the axis AA'. It is evident therefore that finally there is visible in the window 2 that part of the gimbal ring 10 which was initially remote from the window. The invention aims at ensuring that after this manoeuvre the gyroscope still provides information in the same manner as before concerning further changes in the attitude of the craft, which is now flying horizontally. The gyroscope is therefore provided with means for indicating the attitude of the craft whether the gimbal ring 10 is in the position shewn in the drawings or is turned through 180° about the axis BB'.

It is possible to provide indications satisfying these requirements in several ways; one of these is illustrated in the drawings and this will now be described. On the two ends of the gimbal ring 10 there are mounted part-spherical screens 43, 44, uniformly coloured in some neutral shade to serve as a background for the indications. Through these screens there protrude rods 45, 46, extending from the rotor-case pivots 11, 12. On the outer ends of these rods there are mounted discs 47, 48 and also vertical pointers 49, 49'; 50, 50', the latter being curved in the vertical plane containing them so as to lie close to the screens 43, 44. The indications of the attitude of the craft are provided by the relation between whichever of the discs 47, 48, with its associated pointer 49, 49' or 50, 50' is visible in the window, on the one hand, and certain cooperating reference members or markings fixed relative to the instrument case, on the other hand. There are two of these fixed reference members or markings, both carried on an annular ring 51 surrounding the window opening on the inside of the window glass 2. The first is a strip 52 (Fig. 9), extending diametrically across the annular ring 51, and having a form suggestive of an aeroplane in end-on flight away from the observer. The central portion of this figure consists of a ring 53, suggestive of the fuselage of the aeroplane, and just large enough to surround the disc 47 when the latter is central in the window. The second reference marking consists of a set of widely spaced bank angle graduations 54 provided on the upper part of the ring 51; these are readable against the gyroscopically stabilised vertical pointer 49; the words "Right" and "Left" are associated with them to indicate right bank or left bank respectively. If Fig. 10, which shows the indications provided during a dive, is contrasted with Fig. 9, which shows the indications during level flight, it can be seen that the disc 47 moves down during a dive. The pilot may therefore consider the disc 47 to represent the nose of the aircraft; it is for this reason that the index 47 is chosen to be of disc form so as to be suggestive of a propeller boss or spinner.

If Fig. 11, which represents the conditions during a bank to the left, is compared with the level flight conditions of Fig. 9, it can be seen that the relation of the aeroplane figure 52 to the vertical line 49 immediately conveys to the observer the ideas "right wing up, left wing down," i. e., "bank to the left."

Fig. 12 shows the indications occurring during the combination of a climb and a right bank. Although in this figure the "nose" 47 is not in the plane of symmetry of the wings of the aeroplane figure 52, so that the indications provided do not pictorially represent the actual conditions in every detail, it remains true that Fig. 12 does convey pictorially the ideas "nose up, left wing up, right wing down," i. e., "climb, and bank to right."

The condition shown in Fig. 11, which has been described as a bank to the left, results from a rotation of the craft about its fore-and-aft axis. If the craft is diving very steeply, a rotation about the fore-and-aft axis becomes a spin rather than a bank. It is desirable that any tendency to spin should be indicated in a clear manner. However, in a very steep dive, the aircraft, inclusive of the instrument case 1 and forked frame 7, is turned through nearly 90° about the axis BB' from the position shown in Figs. 1 and 2, so that the window 2 is almost directly above the gyroscope and the observer is looking almost directly down the rotor axis DD'; the vertical pointers 49, 49' and 50, 50', are therefore no longer visible in the window. Accordingly additional pointers are provided in the form of narrow bars 55, 56, (Fig. 2) lying in the plane of the pointers 49, 49' and 50, 50'; these additional pointers are carried by the rotor case 13 and are adapted to pass inside the gimbal ring 10 if the latter rotates around the rotor case 13 about the axis CC'. Thus the pointers 49, 49', 50, 50', and 55 and 56 provide an indication of the central vertical plane of the gyroscope which is continuous all round the axis BB'. The instrument therefore achieves the result that a turn about the fore-and-aft axis of the craft is indicated in the same general manner, no matter how steeply this axis is inclined.

In the gyro-horizon of the invention, advantage may be taken of the fact that the forked frame 7 is pendulous to cause the instrument to furnish an indication of the false vertical for comparison with the true vertical indication provided by the gyroscope. The instrument illustrated in the drawings includes this additional feature. As shown, a light metal annular frame 57 is fixed on the end of the forked frame 7 near to the window 2. From this frame two arms 58, 59 project forwards towards the window 2 over and under the part-spherical screen 43. These arms terminate in pointers 60, 61 which lie close to the verge ring 51 and between this ring and the vertical pointers 49, 49'. A scale of degrees 62 is provided on the lower part of the verge ring 51, on which scale the angular position of the pointer 61 may be read.

Figure 13:
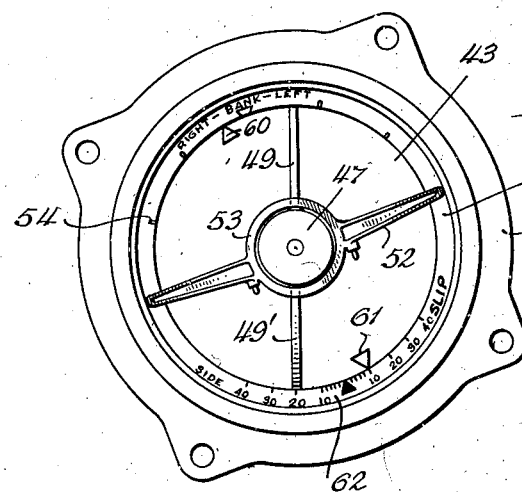

The position of the pointer 61 on the scale 62 may be used as a correct-bank or side-slip indicator, since the pointer 61, by virtue of its attachment to the pendulous frame 7, (by way of the arm 59 and annular ring 57) hangs in the false vertical defined by the resultant of gravity and the lateral acceleration forces, such as the centrifugal forces operating during a turn. When the pointer 61 remains on the zero mark of scale 62 during a turn as shown in Figure 12, the aircraft is correctly banked; if, however, the pointer 61 is to the right of the zero mark of scale 62, as shown in Fig. 13, the aircraft is side-slipping to the right, and it is therefore necessary, in order to correct this condition, that the aircraft should be banked more steeply to the left to bring the zero mark of scale 62 into line with the pointer 61. Incidentally, it may be noted that the direction in which the aircraft has to be banked is readily ascertainable from the fact that it is the direction in which the aeroplane figure 52 must be banked to become symmetrically disposed with respect to the pendulous pointer 61. If desired an indication of banking may be obtained from the point diametrically opposite the pointer 61 with reference to the reference mark 54.

It might seem that the information concerning side-slip or correct banking that is provided by the pointer 61 could be provided by any pendulous indicator even if this were not associated with the gyro-horizon. However, special advantages are obtained by the feature of the invention according to which the pendulous indicator 61 turns about the same fore-and-aft axis as a gyroscopic bank indicator 49, 49'. This advantage is that it can readily be seen from the stabilised pointer 49, 49' whether the pendulous pointer 61 is steady or swinging, and, if the pendulous pointer 61 is swinging, the stabilised pointer 49, 49' provides a reference background for it so that the mean position of its swings can be appreciated and can be used as the angle to which to bank the craft during a turn.

What we claim is:

1. An aircraft gyro horizon comprising a rotor frame, a gimbal ring pivotally mounting the frame on said ring for movement about a normally horizontal axis, a second gimbal ring pivotally mounting the first gimbal ring for movement about a normally horizontal axis perpendicular to said first axis, said frame being thereby universally supported in neutral equilibrium, an outer support in which said second gimbal ring is mounted for movement about an axis parallel to or in line with said first axis, said second ring being pendulously mounted, and attitude indications on both the front and back and top and bottom of said frame, whereby the instrument remains operative and may be read in any attitude of the craft.

2. In an aircraft gyro horizon, a casing, a pendulous first gimbal pivoted in said casing on an axis normally corresponding to the roll axis of the craft, a second gimbal pivoted on said first gimbal on an axis normally corresponding to the pitch axis of the craft, a rotor frame pivoted on said second gimbal on an axis normally coincident with the axis of the pendulous first gimbal, roll indicating means comprising an index fixed to the casing and a reference movable with the rotor frame about the axis thereof coincident with that of the pendulous first gimbal, and means for indicating side slip of said craft comprising a reference fixed to said pendulous first gimbal cooperating with the index of said roll indicating means.

3. A gyro horizon for aircraft, comprising a support, a first gimbal pivoted therein on a roll axis, a second gimbal pivoted on said first gimbal on a pitch axis, a rotor frame pivoted on said second gimbal on an axis normally coincident with the roll axis of the first gimbal, said first gimbal being pendulous, a stationary roll index on said support, an indicator on said first gimbal cooperating with said index to show side slip of the craft, and a second indicator on a trunnion of said rotor frame cooperating with said index to show the attitude of the craft about its roll axis.

4. In an aircraft gyro horizon, a casing, a pendulous first gimbal mounted in said casing for movement about a horizontal axis, a second gimbal mounted on said first gimbal for movement about a normally horizontal axis perpendicular to the axis of the first gimbal, a rotor frame pivotally mounted on said second gimbal on an axis normally in alignment with the axis of said first gimbal, and pitch indicating means comprising an index fixed to said casing and a pair of references therefor, one of which is observable at a time with the index, said references being movable with the rotor frame about the axis thereof normally in alignment with that of the first gimbal and being situated on opposite sides of said frame.

5. A universal gyro horizon having, in addition to its rotor bearing frame and gimbal mounting, an auxiliary gimbal ring having a major axis normally in line with one of the axes of the said frame, gravitationally displaceable means for rendering said auxiliary gimbal pendulous in either of two horizontal positions, and horizon indicating means mounted on both the front and back and top and bottom of said frame so that one of said indicators is always readable without resetting during stunt flying and said auxiliary gimbal remains in either of two horizontal positions of equilibrium.

6. In a gyro horizon for aircraft, a casing having a rotor frame mounted for freedom about a major athwartship axis and a minor fore and aft axis, fixed markings on the window face of said casing comprising a normally horizontal representation of wings and a central ring, a disc secured to each minor trunnion axis of said frame, one of said discs normally occupying the central position in said ring and representing the nose of the craft, and a roll or bank reference extending both above and below each disc, whereby said indicator is always operative regardless of which end the frame is viewed from.

7. In a gyro horizon for aircraft, a casing having a rotor frame mounted for freedom about a major athwartship axis and a minor fore and aft axis, fixed markings on the window face of said casing comprising a normally horizontal representation of wings and a central ring, a symmetrical member secured to a minor trunnion axis of the frame normally occupying the central position in said ring and representing the nose of the craft, whereby pitch is indicated by up or down displacement of said member from its normal central position in said ring, a pendulously mounted side slip indicator, a roll scale on said casing on which said indicator is readable, and a roll reference extending from said member and also readable on said scale, whereby the angle of bank of the craft is shown with respect to both the real and virtual vertical.

8. An aircraft gyro horizon comprising a rotor frame, a gimbal ring pivotally mounting the frame on said ring for movement about a normally horizontal axis, a second gimbal ring pivotally mounting the first gimbal ring for movement about a normally horizontal axis perpendicular to said first axis, said frame being thereby universally supported in neutral equilibrium, an outer support in which said second gimbal ring is mounted for movement about an axis parallel to or in line with said first axis, and a liquid container partially filled with liquid mounted on said second gimbal ring and extending both above and below its axis within the support, whereby said gimbal has two positions of equilibrium 180 degrees from each other.

9. In a gyro horizon for aircraft, a casing having a rotor frame therein mounted for movement about a major axis corresponding to the athwartship axis of the craft and a minor axis corresponding to the fore and aft axis of the craft, combined pitch and roll indicating means comprising an index fixed to said casing in the form of a normally horizontal representation of wings and a central ring, a reference disc for said pitch index secured to the minor axis of said frame, whereby it is stabilized in roll and pitch, said disc normally occupying a centralized position within said ring, and a vertically extending pointer secured to and extending above and below said disc whereby pitching of the craft is indicated by vertical displacement of said disc with respect to said ring and rolling is indicated by relative inclination between said index and said pointer.

HUGH MURTAGH.
JOHN ALFRED TAYLOR.